(12) United States Patent
McGee

(10) Patent No.: US 10,966,573 B2
(45) Date of Patent: Apr. 6, 2021

(54) MULTI-FUNCTION KITCHEN DEVICE AND METHOD

(71) Applicant: Quilton Yarnell McGee, New York, NY (US)

(72) Inventor: Quilton Yarnell McGee, New York, NY (US)

(*) Notice: Subject to any disclaimer, the term of this patent is extended or adjusted under 35 U.S.C. 154(b) by 282 days.

(21) Appl. No.: 16/164,721

(22) Filed: Oct. 18, 2018

(65) Prior Publication Data
US 2020/0121132 A1 Apr. 23, 2020

(51) Int. Cl.
| *A47J 47/16* | (2006.01) |
| *A21C 3/02* | (2006.01) |
| *B26B 25/00* | (2006.01) |
| *A47J 43/25* | (2006.01) |

(52) U.S. Cl.
CPC .............. *A47J 47/16* (2013.01); *A21C 3/021* (2013.01); *A47J 43/25* (2013.01); *B26B 25/005* (2013.01); *A47J 2201/00* (2013.01)

(58) Field of Classification Search
CPC ......... A21C 3/021; A21C 3/025; A21C 3/028; A21C 11/106; A21C 11/04; A21C 3/10; A21C 11/22; A21C 9/00; A21C 9/068; A47J 47/16; A47J 43/25; A47J 2201/00; A47J 45/02; A47J 45/06; A47J 45/07; A47J 45/08; A47J 45/10; B26B 25/005
See application file for complete search history.

(56) References Cited

U.S. PATENT DOCUMENTS

| 1,052,590 | A | * | 2/1913 | Johnson | A47G 21/14 248/37.3 |
| 1,327,461 | A | * | 1/1920 | Covar | A47J 43/28 492/14 |
| 1,405,920 | A | * | 2/1922 | Kerr | A21C 3/021 492/14 |
| 3,244,122 | A | * | 4/1966 | Agler | A21C 3/021 492/14 |
| 2007/0187347 | A1 | * | 8/2007 | McCreary | A47J 45/02 211/85.31 |
| 2008/0076651 | A1 | * | 3/2008 | Curtin | A21C 11/106 492/14 |
| 2013/0156895 | A1 | * | 6/2013 | Malisani | A23L 5/10 426/87 |
| 2014/0231603 | A1 | * | 8/2014 | Holland | A47J 47/16 248/176.1 |

* cited by examiner

*Primary Examiner* — Robert J Scruggs
(74) *Attorney, Agent, or Firm* — Runyan Law; Charles Runyan

(57) ABSTRACT

A multi-function kitchen tool is disclosed herein. The multi-function kitchen tool includes a rolling pin, a base, and a handle cover configured in a compact combination. In some embodiments, the multi-function kitchen tool includes a mixing bowl, a rolling pin, a cheese grater, a pizza slicer, a juicer, etc., combined together into one kitchen tool. The multi-function kitchen tool is useful for providing a multi-function kitchen tool for compact storage.

19 Claims, 5 Drawing Sheets

MULTI-FUNCTION KITCHEN DEVICE AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of kitchen utensils and more specifically relates to a multi-function kitchen tool.

2. Description of Related Art

For the preparation of most meals, a cook often requires a number of different kitchen utensils or tools, each of which serves a separate useful function. At times, the search may interfere with meal preparation, especially if the item being searched for cannot readily be found. One could lay out all utensils on a table top, or the like, in attempt to keep items within reach, but this may be unsightly and is not practical. Thus, a suitable solution is desired.

U.S. Pat No. 2014/0231603 to Holland relates to a culinary appliance. The described culinary appliance includes attachable and detachable components may be in the shape of a person, icon, avatar, animal, an inanimate item, a product, or the like, or any appropriate combination thereof. The detachable components may comprise utensils, wares, or the like. For example, the culinary appliance may be formed in the likeness of a person and appendages of the person may comprise cooking utensils, measuring utensils, and/or bowls.

BRIEF SUMMARY OF THE INVENTION

In view of the foregoing disadvantages inherent in the known kitchen utensils art, the present disclosure provides a novel multi-function kitchen device and method. The general purpose of the present disclosure, which will be described subsequently in greater detail, is to provide a multi-function kitchen tool for compact storage.

A multi-function kitchen tool is disclosed herein. The multi-function kitchen tool may include a rolling pin having a rolling pin axis, an outer rolling surface, an inner cavity, a first detachable handle and a second detachable handle opposite the first detachable handle, relative to the rolling pin axis, the outer rolling surface configured to rotate about the rolling pin axis via the first detachable handle and the second detachable handle. The first detachable handle may have a first handle axis, a first handle end, and a first utensil end opposite the first handle end, relative the first handle axis, the first detachable handle may include a first kitchen utensil proximate the first utensil end, and the first detachable handle further may include a first rolling pin interface configured to secure and align the first detachable handle to the rolling pin. Similarly, the second detachable handle may have a second handle axis, a second handle end, and a second utensil end opposite the second handle end, relative the second handle axis, the second detachable handle may include a second kitchen utensil proximate the second utensil end, and the second detachable handle further may include a second rolling pin interface configured to secure and align the second detachable handle to the rolling pin. Further, the multi-function kitchen tool may include a base having a vertical axis and configured to rest on the countertop surface. The base may be further be configured to receive and removably support the rolling pin vertically thereon during compact storage via at least one of the first detachable handle and the second detachable handle, and such that the rolling pin axis, the first handle axis, and the second handle axis are coaxial with the vertical axis. In addition, the multi-function kitchen tool may include a handle cover having a cover axis, the handle cover configured to removably attach to and obscure an other of the at least one of the first detachable handle and the second detachable handle during compact storage such that that the cover axis may be coaxial with the vertical axis, the handle cover including, a tip section and a handle section, the tip section being detachable from the handle section. In one embodiment the tip section may have a tapered shape, and the handle section may have a tubular shape.

A method of using multi-function kitchen tool is also disclosed herein. The method of using multi-function kitchen tool may comprise the steps of: providing the multi-function kitchen tool as above; placing the base on the countertop surface; standing the rolling pin on the base such that the rolling pin may be vertically supported thereon via the at least one of the first detachable handle and the second detachable handle, and such that the rolling pin axis, the first handle axis, and the second handle axis are coaxial with the vertical axis; and attaching the handle cover to the other of the at least one of the first detachable handle and the second detachable handle during compact storage such that that the cover axis may be coaxial with the vertical axis.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a multi-function kitchen device and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to kitchen utensils, and more particularly to a multi-function kitchen device and method as used to improve the multi-use kitchen utensil for compact storage.

Generally, the multi-function kitchen device may be shaped similar to a rocket-ship and include a space saving design with a multi-purpose functionality. The device may be at least partially made of a transparent glass or plastic material to enable a user to view the utensils and provide a high-end look to a kitchen counter. The device may include six kitchen utensils, for example. To illustrate, the utensils may be a juicer with a mixing bowl, a biscuit cutter, a cheese grater, a pizza cutter wheel, and a rolling pin which may form the center transparent cylinder. All of the utensils may be viewed through the transparent cylinder and bowls. The device may include three legs, for example, that add to the rocket-ship concept so that it stands upright, taking up very little space on the kitchen counter. The kitchen utensils may be made from high end stainless steel or a plastic material.

Figure 1:
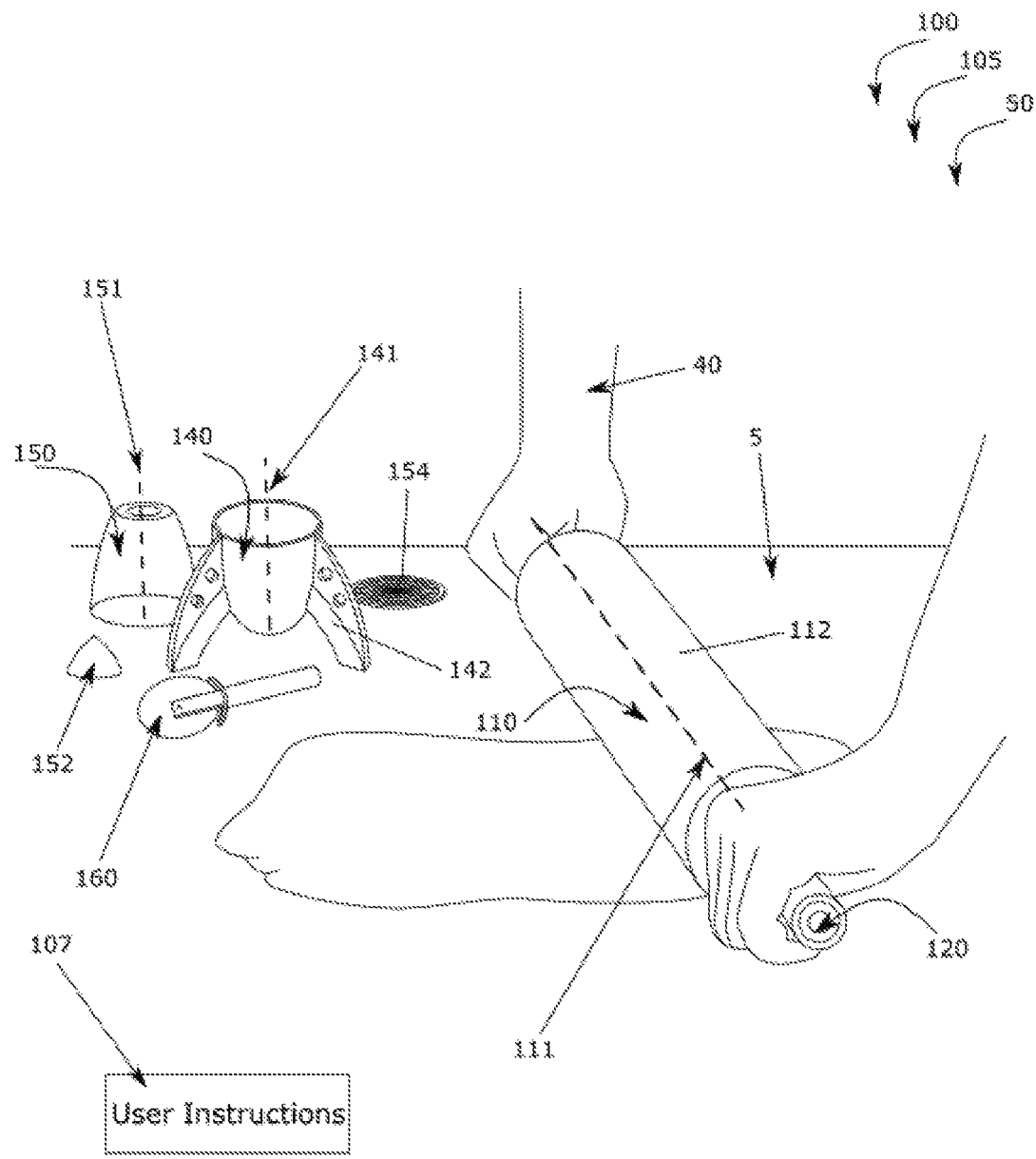
FIG. 1 is a perspective view of a multi-function kitchen tool during an 'in-use' condition, according to an embodiment of the disclosure.

Referring now more specifically to the drawings by numerals of reference, there is shown in FIGS. 1-4, various views of a multi-function kitchen tool 100. FIG. 1 shows the multi-function kitchen tool 100 during an 'in-use' condition 50, according to an embodiment of the present disclosure. As illustrated, the multi-function kitchen tool 100 may include a rolling pin 110 including a first detachable handle 120 and a second detachable handle 130 (FIG. 3), a base 140, and a handle cover 150. In a preferred embodiment, the multi-function kitchen tool 100 may further include a third kitchen utensil 160.

The rolling pin 110 may have a rolling pin axis 111, an outer rolling surface 112 (configured to contact the food item as shown), an inner cavity 113 (FIG. 3), the first detachable handle 120 and the second detachable handle 130 opposite the first detachable handle 120, relative to the rolling pin axis 111. The outer rolling surface 112 may be configured to rotate about the rolling pin axis 111 via the first detachable handle 120 and the second detachable handle 130, such that the rolling pin 110, the first detachable handle 120 and the second detachable handle 130 may be detached from the multi-function kitchen tool 100 and used by a user 40 to shape and flatten a food item (e.g., here, a dough) on a countertop surface 5.

According to one embodiment, the multi-function kitchen tool 100 may be arranged as a kit 105. The kit may include a set of user instructions 107. The instructions may detail functional relationships in relation to the structure of the multi-function kitchen tool 100 (such that the multi-function kitchen tool 100 can be used, maintained, or the like, in a preferred manner).

Figure 2:
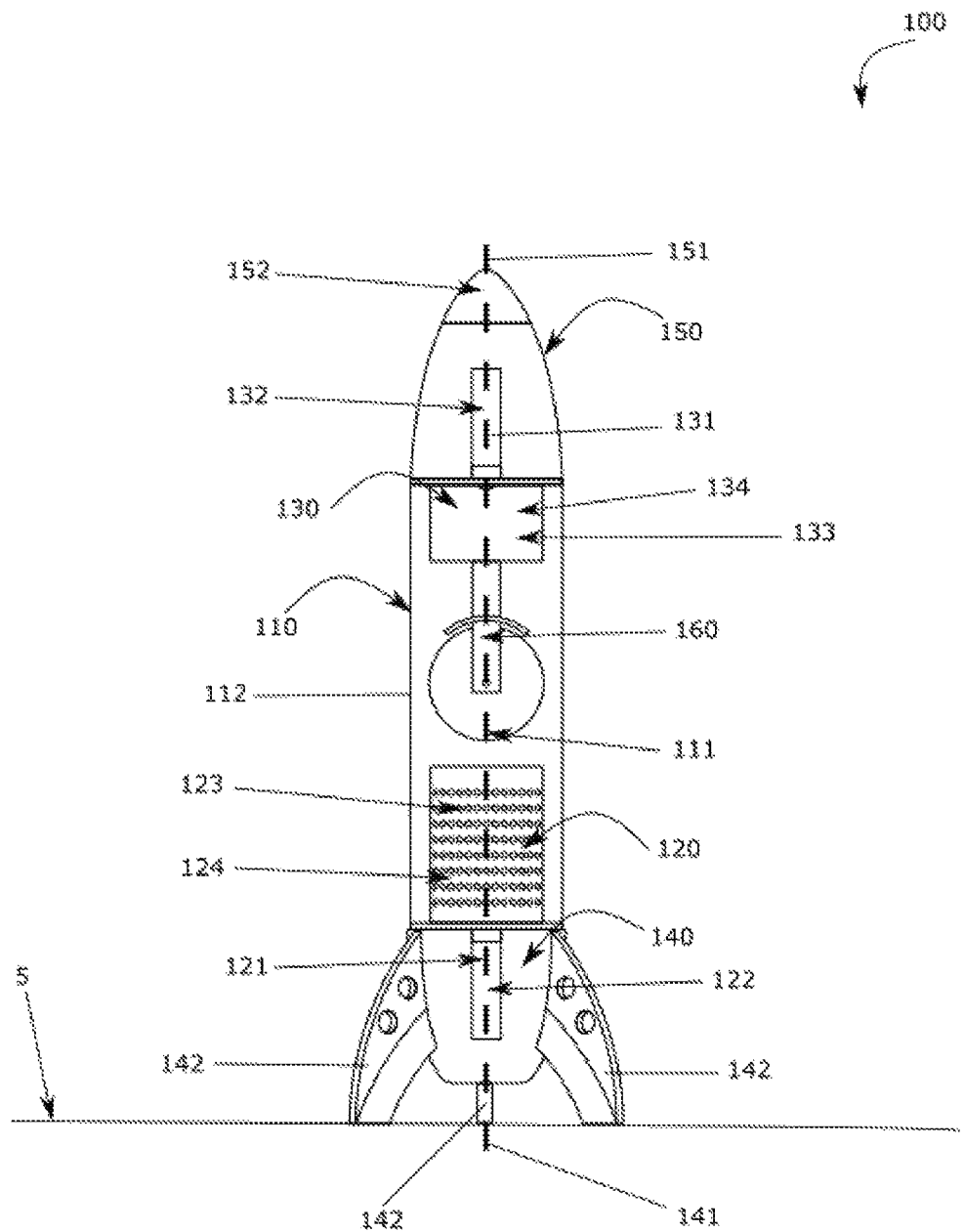
FIG. 2 is a front view of the multi-function kitchen tool of FIG. 1, according to an embodiment of the present disclosure.

FIG. 2 shows a front view of the multi-function kitchen tool 100 of FIG. 1, according to an embodiment of the present disclosure. As above, the multi-function kitchen tool 100 may include rolling pin 110 including a first detachable handle 120 and a second detachable handle 130, a base 140, and a handle cover 150. Illustrated here is the multi-function kitchen tool 100 during compact storage on the countertop surface 5 and arranged in a rocket-shape (e.g., generally elongated cylindrical shape with a tapered tip and a finned tail).

According to one embodiment, one of more components of the multi-function kitchen tool 100 may be translucent or semi-transparent. For example, here handle cover 150, outer rolling surface 112, base 140 are transparent, and provide visibility to the kitchen utensils inside of the multi-function kitchen tool 100. Beneficially, one may see what tools are available for use, their condition, and be considered interesting and/or attractive to look at.

The base 140 may have a vertical axis 141 and be configured to rest on the countertop surface 5. Further, the base 140 may be configured to receive and removably support the rolling pin 110 vertically thereon during compact storage via at least one of the first detachable handle 120 and the second detachable handle 130, and such that the rolling pin 110 axis, the first handle axis 121, and the second handle axis 131 are coaxial with the vertical axis 141. In addition, the handle cover 150 may have a cover axis 151 and may be configured to removably attach to and obscure another of the at least one of the first detachable handle 120 and the second detachable handle 130 during compact storage such that that the cover axis 151 is coaxial with the vertical axis 141.

Figure 3:
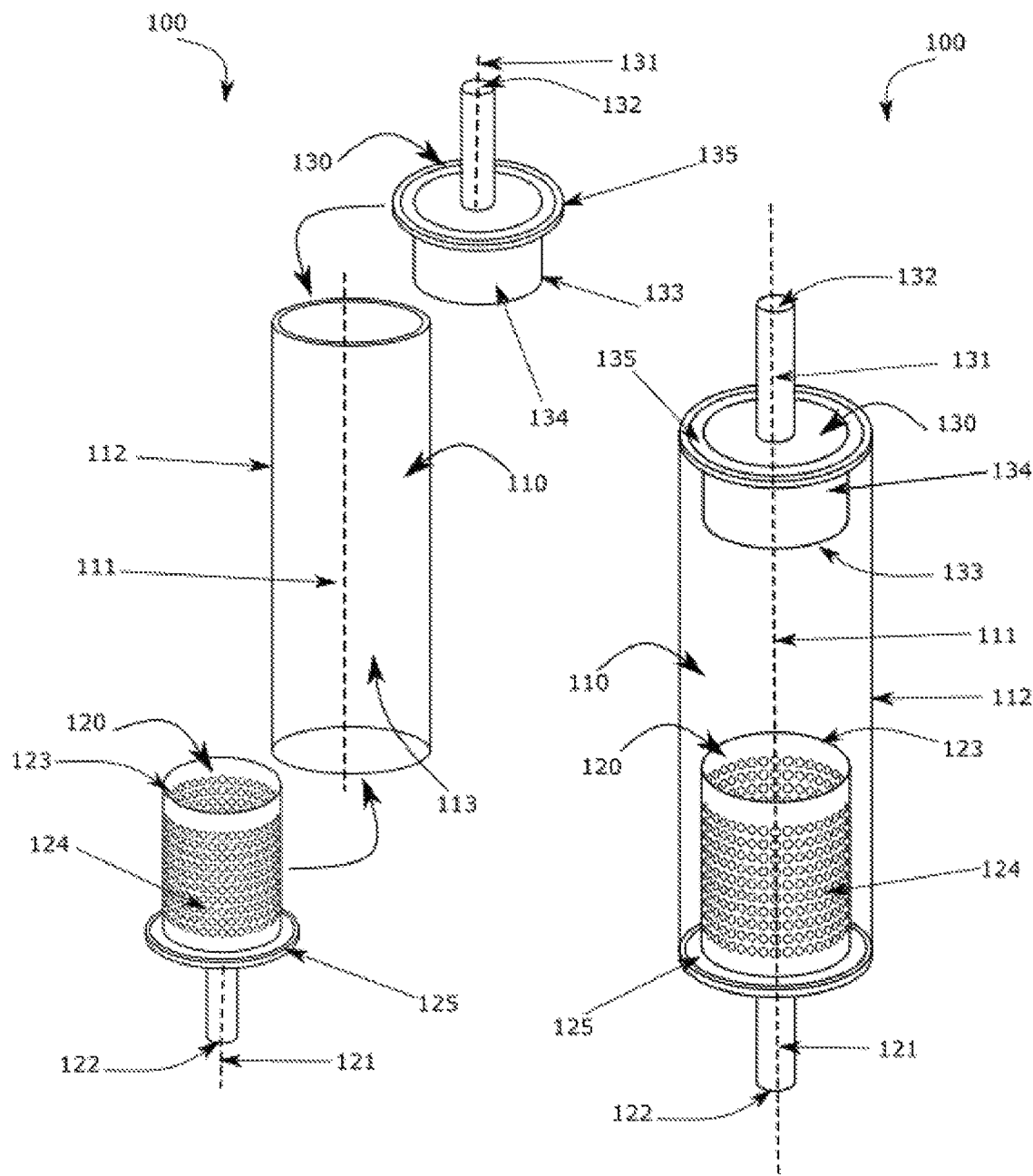
FIG. 3 is an exploded view of a multi-function kitchen tool showing its assembly, according to another embodiment of the present disclosure.

FIG. 3 is an exploded view of the multi-function kitchen tool 100 showing its assembly, according to another embodiment of the present disclosure. Illustrated here is a close-up view of the rolling pin 110, showing the first detachable handle 120 and the second detachable handle 130 disassembled or otherwise detached from the outer rolling surface 112 of the rolling pin 110, and also showing the first detachable handle 120 and the second detachable handle 130 assembled or otherwise attached to the outer rolling surface 112 of the rolling pin 110 via a first rolling pin interface 125 and a second rolling pin interface 135. As shown, the first kitchen utensil 124 and the second kitchen utensil 134 may be configured to stow within the inner cavity 113 of the rolling pin 110 during compact storage. Further, the first detachable handle 120 and the second detachable handle 130 may be configured to rotatably lock on to the outer rolling surface 112 of the rolling pin 110.

As above, and as shown when assembled, the rolling pin 110 may have the rolling pin axis 111, the outer rolling surface 112, the inner cavity 113, the first detachable handle 120 and the second detachable handle 130 opposite the first detachable handle 120, relative to the rolling pin axis 111. The outer rolling surface 112 may be configured to rotate about the rolling pin axis 111 via the first detachable handle 120 and the second detachable handle 130. The outer rolling surface 112 may be transparent. In this embodiment, the rolling pin 110 may be made from glass. In other embodiments, the rolling pin 110 may be made from plastic.

The first detachable handle 120 may have a first handle axis 121, a first handle end 122, and a first utensil end 123 opposite the first handle end 122, relative the first handle axis 121. Further, the first detachable handle 120 may include a first kitchen utensil 124 proximate the first utensil end 123. As above, the first detachable handle 120 may include the first rolling pin interface 125 configured to secure and align the first detachable handle 120 to the rolling pin 110. Similarly, the second detachable handle 130 may have a second handle axis 131, a second handle end 132, and a second utensil end 133 opposite the second handle end 132, relative the second handle axis 131. Further, the second detachable handle 130 may include a second kitchen utensil 134 proximate the second utensil end 133. Moreover, as above, the second detachable handle 130 may further include the second rolling pin 110 interface configured to secure and align the second detachable handle 130 to the rolling pin 110.

In a preferred embodiment, the first kitchen utensil 124 may be a dough cutter. Further, in the preferred embodiment, the second kitchen utensil 134 may be a cheese grater. In this embodiment, at least one of the dough cutter and the cheese grater may have a cylindrical shape. Further, at least one of the dough cutter and the cheese grater may be integrated with or otherwise operable by the first detachable handle 120 or the second detachable handle 130, respectively.

Figure 4:
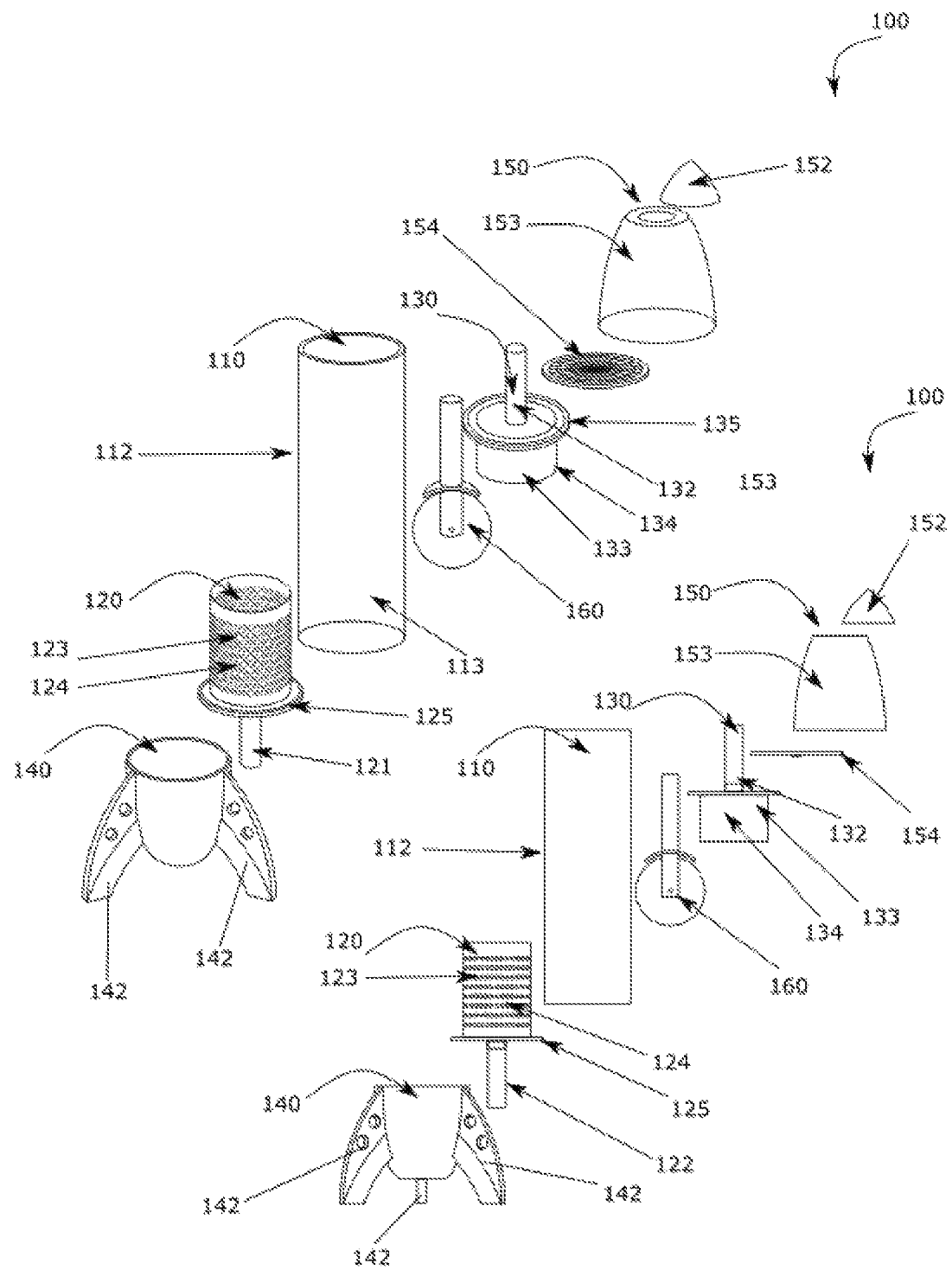
FIG. 4 is an exploded view of the multi-function kitchen tool, with the multi-function kitchen tool being shown from two varying perspectives, according to an embodiment of the present disclosure.

FIG. 4 is an exploded view of the multi-function kitchen tool 100 being shown from two varying perspectives, according to an embodiment of the present disclosure. The angles illustrated here may provide clarity and aid in demonstrating how the components of the multi-function kitchen tool 100 attach together for compact storage. As above, the multi-function kitchen tool 100 may include the rolling pin 110, the first detachable handle 120, the second detachable handle 130, the base 140, and the handle cover 150.

In a preferred embodiment, the multi-function kitchen tool may further comprise the third kitchen utensil 160 configured to attach to at least one of the first detachable handle 120 and the second detachable handle 130 and to stow inside the inner cavity 113 during compact storage. In this preferred embodiment, the third kitchen utensil 160 may be a pizza cutter. The first kitchen utensil 124, the second kitchen utensil 134 and the third kitchen utensil 160 may not be limited to a dough cutter, a cheese grater and a pizza cutter respectively. Further examples of kitchen utensils may include a knife, a sieve, a garlic press, a ladle, a mortar and pestle, a potato masher, scissors, a spatula, a spoon, a whisk, and the like.

As illustrated, the base 140 may include or otherwise be configured as an open-ended vessel, configured to hold a food-item. In a preferred embodiment, the open-ended vessel may be configured as a mixing bowl for mixing a variety of food items. In one embodiment, the food item may be a liquid. In further examples, the open-ended vessel may be configured as a drinking mug, a measuring cup, or the like.

Further, the base 140 may include at least three support legs 142 (as illustrated) configured to provide additional support, and further configured as fins or otherwise configured to give the multi-function kitchen tool 100 a rocket-like appearance. In this embodiment, the at least three support stands are distributed about a periphery of the base 140, relative to the vertical axis 141.

The handle cover 150 may include, a tip section 152 and a handle section 153, the tip section 152 being detachable from the handle section 153 and having a tapered shape, and the handle section 153 having a tubular shape or funnel shape. Additionally, the handle cover 150 may be configured to lock to the rolling pin 110 during compact storage. In a preferred embodiment, the handle cover 150 may further include a detachable strainer 154 and may be configured to reassemble as a juicer with the tip section 152 configured as a juicer cap and the handle section 153 configured as a strainer bowl.

Figure 5:
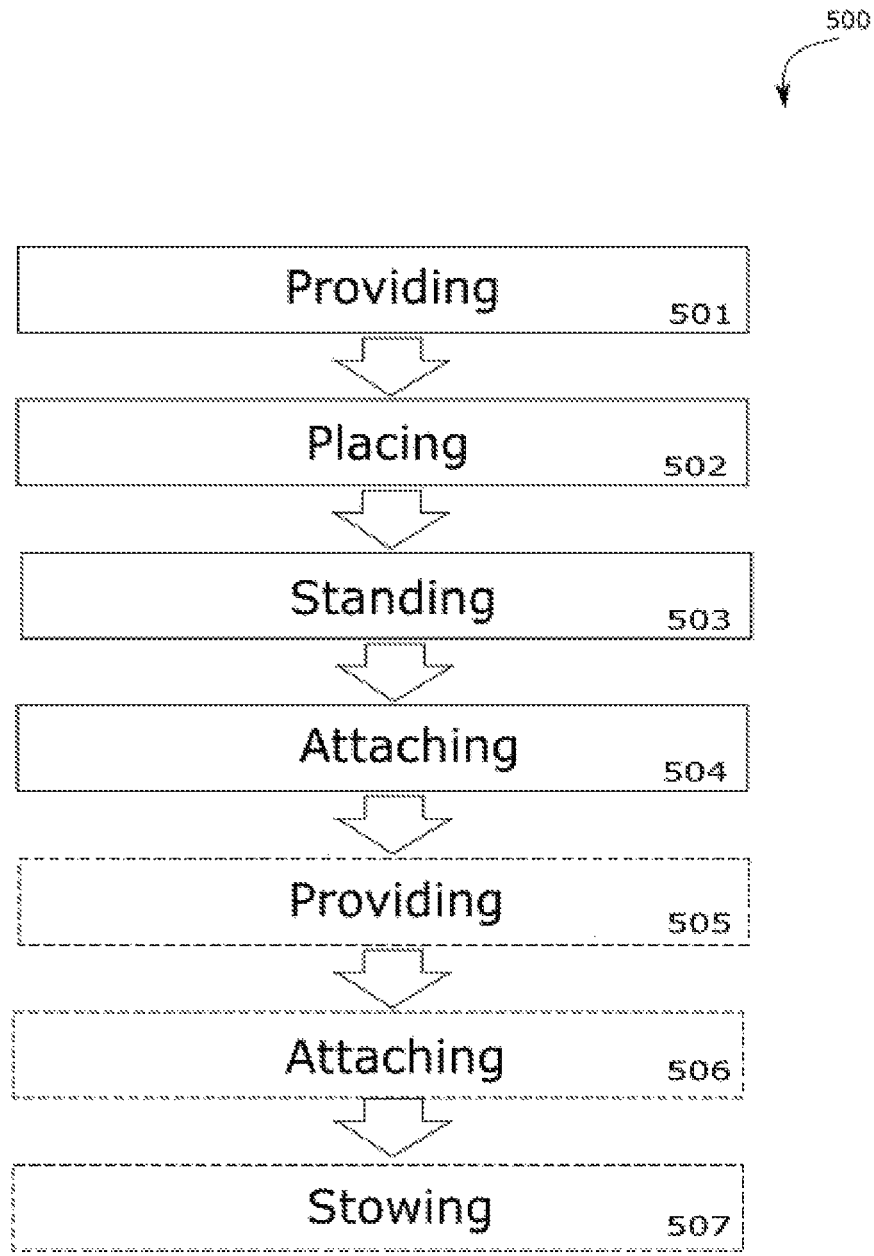
FIG. 5 is a flow diagram illustrating a method of use for multi-function kitchen tool, according to an embodiment of the present disclosure.

FIG. 5 is a flow diagram illustrating a method for compactly storing a plurality of kitchen tools 500, according to an embodiment of the present disclosure. As illustrated, the method for compactly storing a plurality of kitchen tools 500 may include the steps of: step one 501, providing the multi-function kitchen tool 100 as above; step two 502, placing the base 140 on the countertop surface 5; step three 503, standing the rolling pin 110 on the base 140 such that the rolling pin 110 is vertically supported thereon via the at least one of the first detachable handle 120 and the second detachable handle 130, and such that the rolling pin 110 axis, the first handle axis 121, and the second handle axis 131 are coaxial with the vertical axis 141; and step four 504, attaching the handle cover 150 to the other of the at least one of the first detachable handle 120 and the second detachable handle 130 during compact storage such that that the cover axis 151 is coaxial with the vertical axis 141. Further steps may include: step five 505, providing a third kitchen utensil 160 configured to attach to at least one of the first detachable handle 120 and the second detachable handle 130 and to stow inside the inner cavity 113 during compact storage; step six 506, attaching the third kitchen utensil 160 to attach to the at least one of the first detachable handle 120 and the second detachable handle 130; and step seven 507, stowing the third kitchen utensil 160 inside the inner cavity 113.

It should be noted that step five 505, step six 506 and step seven 507 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for multi-function kitchen tool 100 (e.g., different step orders within abovementioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A multi-function kitchen tool for compact storage on a countertop surface, the multi-function kitchen tool comprising:

a rolling pin having a rotating rolling surface, an inner cavity, a first detachable handle and a second detachable handle, the first handle having a first handle end, and a first utensil end opposite the first handle end, including a first kitchen utensil the second handle having a second handle end, and a second utensil end opposite the second handle end, including a second kitchen utensil a vertical base having an upward-pointing opening that in a support configuration engages one of the first or second detachable handles to support the rolling pin vertically; and a handle cover having a downward pointing opening that engages the other of the first or second detachable handle with the handle cover including a tapered tip section separate from a tubular body.

2. The multi-function kitchen tool of claim 1, wherein the first kitchen utensil and the second kitchen utensil fit within the inner cavity.

3. The multi-function kitchen tool of claim 2, wherein the first kitchen utensil is a dough cutter.

4. The multi-function kitchen tool of claim 3, wherein the second kitchen utensil is a cheese grater.

5. The multi-function kitchen tool of claim 4, wherein at least one of the dough cutter and the cheese grater is cylindrical.

6. The multi-function kitchen tool of claim 1, wherein the first detachable handle and the second detachable handle are configured to rotatably lock on to the rolling pin.

7. The multi-function kitchen tool of claim 1, wherein the handle cover locks to the rolling pin during compact storage.

8. The multi-function kitchen tool of claim 1, wherein the base in a removed configuration is a bowl.

9. The multi-function kitchen tool of claim 8, wherein the food item is a liquid.

10. The multi-function kitchen tool of claim 9, wherein the base includes at least three support legs extending downward from the base.

11. The multi-function kitchen tool of claim 10, wherein the at least three support stands are distributed about a periphery of the base, relative to the vertical axis.

12. The multi-function kitchen tool of claim 1, wherein the handle cover further includes a detachable strainer, and is configured to reassemble as a juicer with the tip section configured as a juicer cap and the handle section configured as a strainer bowl.

13. The multi-function kitchen tool of claim 1, further comprising a third kitchen utensil configured to attach to at least one of the first detachable handle and the second detachable handle and to stow inside the inner cavity during compact storage.

14. The multi-function kitchen tool of claim 13, wherein the third kitchen utensil is a pizza cutter.

15. The multi-function kitchen tool of claim 1, wherein the outer rolling surface is transparent.

16. The multi-function kitchen tool of claim 1, wherein the multi-function kitchen tool is arranged to have a rocket-shape during compact storage.

17. A multi-function kitchen tool for compact storage on a countertop surface, the multi-function kitchen tool comprising:
   a rolling pin having a rotating rolling surface, an inner cavity, a first detachable handle and a second detachable handle,
   the first handle having a first handle end, and a first utensil end opposite the first handle end, including a first kitchen utensil
   the second handle having a second handle end, and a second utensil end opposite the second handle end, including a second kitchen utensil
   a vertical base having an upward-pointing opening that in a support configuration engages one of the first or second detachable handle to support the rolling pin vertically; and
   a handle cover having a downward pointing opening that engages the other of the first or second detachable handle the handle cover including a tapered tip section separate from a tubular body
   a third kitchen utensil configured to attach to at least one of the first detachable handle and the second detachable handle and to stow inside the inner cavity during compact storage; and
   wherein the first kitchen utensil and the second kitchen utensil are configured to stow within the inner cavity of the rolling pin during compact storage;
   wherein the first kitchen utensil is a dough cutter;
   wherein the second kitchen utensil is a cheese grater;
   wherein at least one of the dough cutter and the cheese grater has a cylindrical shape;
   wherein the first detachable handle and the second detachable handle are configured to rotatably lock on to the rolling pin;
   wherein the handle cover is configured to lock to the rolling pin during compact storage;
   wherein the base includes an open-ended vessel configured to hold a food item;
   wherein the food item is a liquid;
   wherein the base includes at least three support legs configured to provide additional support;
   wherein the at least three support stands are distributed about a periphery of the base, relative to the vertical axis;
   wherein the handle cover further includes a detachable strainer, and is configured to reassemble as a juicer with the tip section configured as a juicer cap and the handle section configured as a strainer bowl;
   wherein the third kitchen utensil is a pizza cutter;
   wherein the outer rolling surface is transparent; and
   wherein the multi-function kitchen tool is arranged to have a rocket-shape during compact storage.

18. A method for compactly storing a plurality of kitchen tools, on a countertop surface, the method comprising the steps of:
   providing
   a rolling pin having a rotating rolling surface, an inner cavity, a first detachable handle and a second detachable handle,
   the first handle having a first handle end, and a first utensil end opposite the first handle end, including a first kitchen utensil
   the second handle having a second handle end, and a second utensil end opposite the second handle end, including a second kitchen utensil
   providing a vertical base having an upward-pointing opening that in a support configuration engages one of the first or second detachable handle to support the rolling pin vertically;
   providing a handle cover having a downward pointing opening that engages the other of the first or second detachable handle the handle cover including a tapered tip section separate from a tubular body
   placing the base on the countertop surface;
   standing the rolling pin in the base such that the rolling pin is vertically supported; and
   attaching the handle cover to another end of the rolling pin.

19. The method of claim 18, further comprising the steps of:
   providing a third kitchen utensil configured to attach to at least one of the first detachable handle and the second detachable handle and to stow inside the inner cavity during compact storage; and
   attaching the third kitchen utensil to attach to the at least one of the first detachable handle and the second detachable handle; and
   stowing the third kitchen utensil inside the inner cavity.

* * * * *